Jan. 28, 1947. P. N. GARDNER 2,414,864
METHOD OF AND MEANS FOR DETERMINING THE VISCOSITIES OF LIQUIDS
Filed June 14, 1944
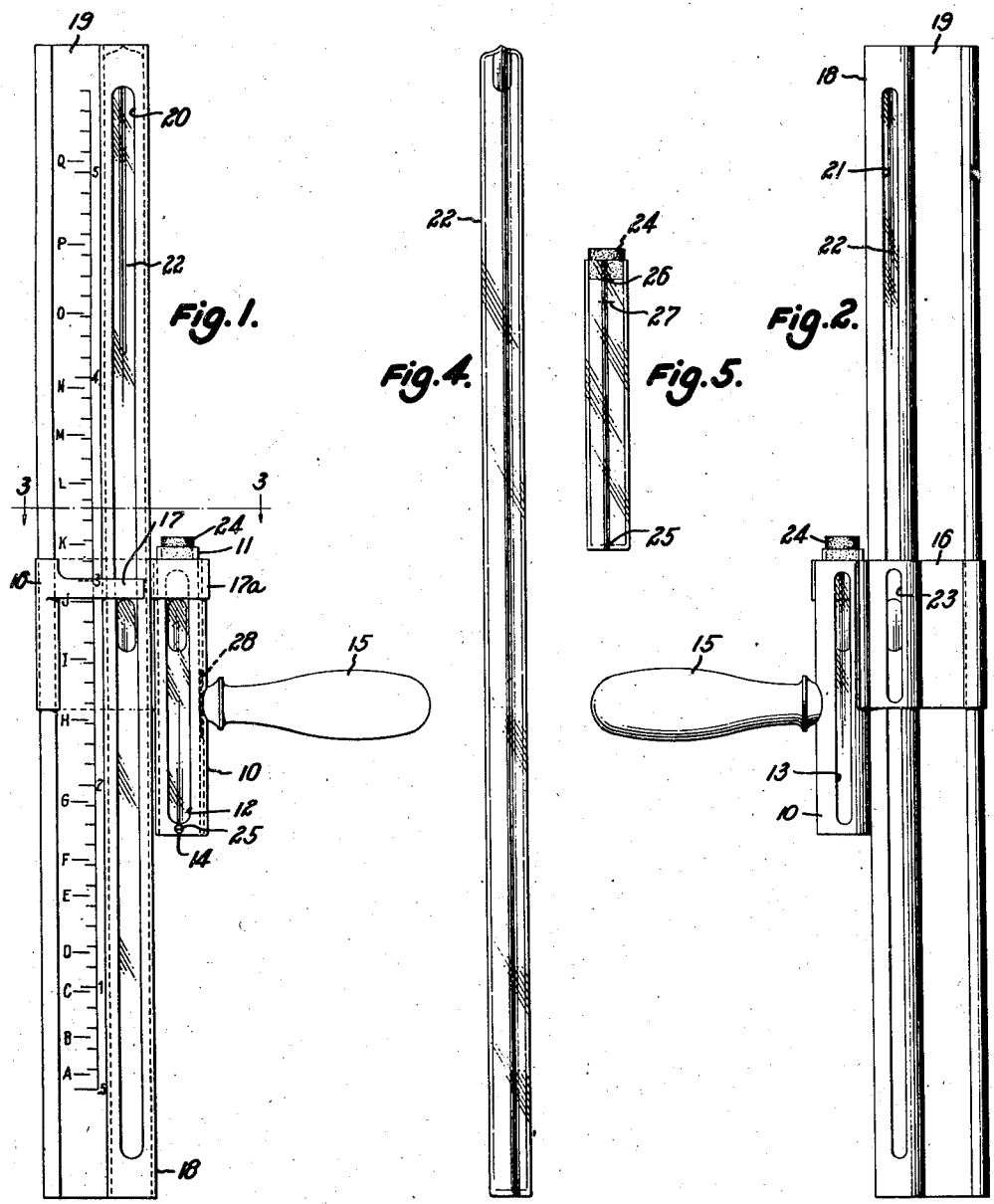
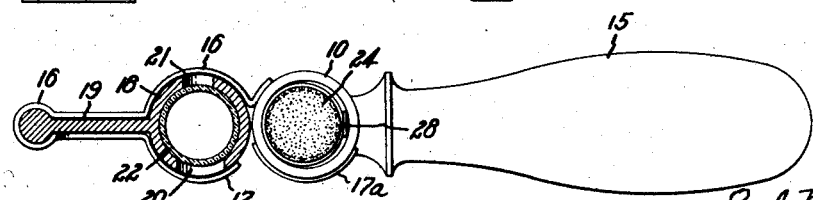
Inventor:
Paul N. Gardner,
By Pierce & Scheffler,
his Attorneys.

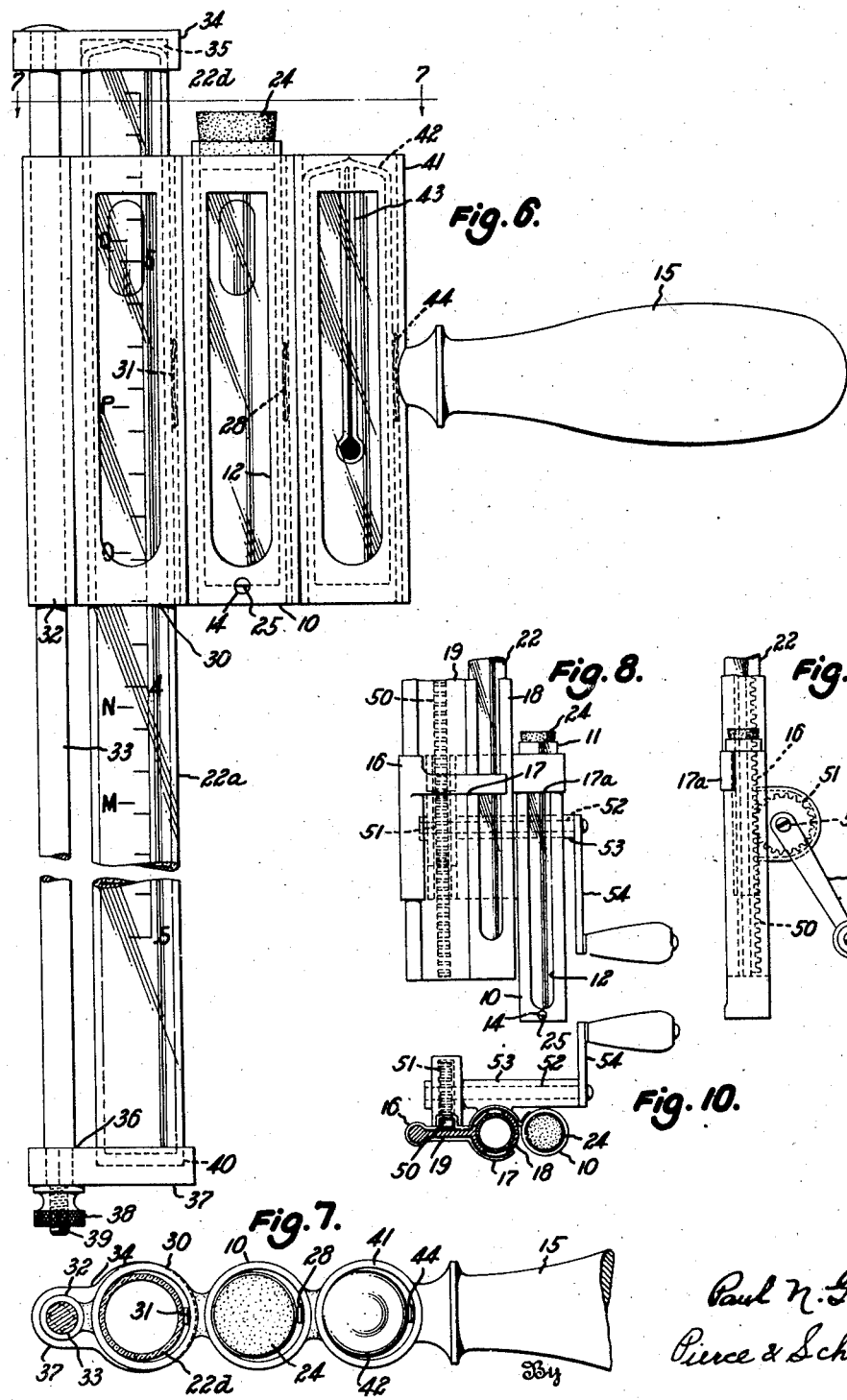

Patented Jan. 28, 1947

2,414,864

UNITED STATES PATENT OFFICE 2,414,864

METHOD OF AND MEANS FOR DETERMINING THE VISCOSITIES OF LIQUIDS

Paul N. Gardner, Bethesda, Md.

Application June 14, 1944, Serial No. 540,214

14 Claims. (Cl. 73—57)

This invention relates to a method of, and means for, determining the viscosities of liquids (e. g., oils), and is more particularly concerned with the provision of an improved device (hereinafter called "viscometer" for measuring the viscosity of an oil by comparison with an oil of known viscosity. The invention includes both apparatus and method aspects.

There are four known types of viscometers, viz., the air bubble, the falling weight, the torsion, and the efflux types. The air bubble type has been developed by, among others, Dr. Henry A. Gardner. In the latter's standard work, "Physical and Chemical Examination of Paints, Varnishes, Lacquers and Colors," 9th ed., 2nd printing, October 1, 1940, at pages 216, 217 and 218 thereof, there is described the "Gardner-Holdt bubble viscometer," the same being one or more sets of standards containing liquids of varying viscosities the absolute viscosities of which previously have been determined. Each "standard" is a glass vial or tube, standardized as to internal dimensions, closed at one end and filled (save for a bubble of air) with the liquid of known absolute viscosity; the opposite end of the tube is sealed off. The size of the air bubble is not critical except that it is longer than the internal diameter of the tube. When the set of "standard" tubes are inverted, the times required for the bubble to rise are directly proportional to the absolute viscosities of the liquids in the tubes, and inversely proportional to the specific gravity. For determining the viscosity of a sample of unknown viscosity, an empty standardized tube is filled (save for the aforesaid air bubble) with the liquid whose viscosity is to be determined, the size of the air bubble being adjusted to the size of the bubbles in the "standards," and is tightly stoppered. The sample tube and the standards are brought to a temperature of 25° C., are then inverted, and the rate of rise of the bubble in the sample tube is compared with the rates of rise in the standards. The test is then repeated, using, say, the two standards giving most nearly the same bubble test as the sample. If the rate of rise in the sample is intermediate the two standards, the absolute viscosity of the sample is calculated at a value intermediate the absolute viscosities of the two standards. The Gardner-Holdt bubble viscometer standards are furnished in 4 ranges, viz., a set of 20 standards from A to T (the "varnish series") for liquids ranging in viscosity from 0.5 to 5.5 poises: a set of 12 standards for the range 6.27-148.0 poises; a set of 5 standards for the range 0.00505-0.321 poises; and a set of 10 standards for printing ink vehicles. The extent of the accuracy attainable in this method of determination depends at least in part on using tubes of the same exact diameter, a variation of more than about 0.025 mm. being intolerable.

The apparatus of the present invention is an improvement over the Gardner-Holdt bubble viscometer. According thereto, a single master standard tube, with which a viscosity scale is associated, is substituted for an entire set of the Gardner-Holdt standards (e. g., for the 20 standards of the "varnish series"). This improved apparatus comprises two closely adjacent and parallel tubes mounted for relative longitudinal movement with respect to each other, one of said tubes (i. e., the aforesaid "master standard tube") containing (or adapted to contain) a liquid of known viscosity, and the other adapted to contain a liquid of unknown viscosity (i. e., the "sample tube"), a viscosity scale associated with the master standard tube, and rectilinear index-establishing means associated with the tubes at right angles to their major axes and at a fixed predetermined position remote from the bottom of the sample tube. The mounting of the two tubes may take the form of a holding device so formed that the master standard tube is longitudinally slidable therein whereas the other tube (i. e., the tube adapted to contain the sample of liquid of unknown viscosity) is in fixed position.

In operation, as the two bubbles rise in the vertically held tubes, the master tube is adjusted (i. e., slid up and down) in the holding device so as to bring like meniscuses, say, the top meniscuses, of the two bubbles into the same horizontal plane when the bubble in the sample tube has moved a predetermined distance from the bottom of the latter. The kinematic viscosity of the sample is directly read from the calibration opposite the bubble meniscus on the closely adjacent and parallel master tube and the absolute viscosity may be determined from the observed kinematic viscosity value by multiplying the latter by the specific gravity of the sample.

The viscosity calibration indicia associated with the master standard tube may be provided on the tube itself or they may be provided on a metal member substantially coextensive with and in fixed position beside the master standard tube. The calibration itself may be in Gardner-Holdt units, in Stokes, in Saybolt units or in any other known viscosity measurement units. I can, where so desired, provide the master standard tube with two different systems of viscosity calibration, e. g., Stokes and Gardner-Holdt units. Stoke times specific gravity equals poises. The advantage of employing Stokes is that thereby kinematic viscosity is measured, whereas the Gardner-Holdt units facilitate viscosity determination when the liquid being tested has the same or approximately the same specific gravity as that of the liquid in the master standard tube. The data for clear liquids can be converted, by tables, from kinematic to absolute viscosity. A further description of a mode of calibrating the master standard appears hereinafter.

Over and above the criteria set out above, the precise form of the means for mounting the two tubes is not critical. Preferably, it includes an offstanding handle, for support and manual operation of the instrument, and a straight-edge or "index line," at 90° to the major axis of the tubes and coincident to the aforesaid "mark," for observing the point at which the meniscuses of the two bubbles are to be in the same horiozntal plane at the moment manipulation of the master standard tube is stopped.

Advantageously, the holding device may be employed, the same being constituted by an apertured (e. g., slotted) metal sheath for housing the tube adapted to contain the liquid of unknown viscosity, an offstanding handle fixed to a side of said metal sheath, a guide member for the master standard tube fixed on the side of the metal sheath remote from said handle, said guide member being adapted to hold said master standard tube adjacent and parallel to the other tube and longitudinally movable with respect to the latter, a viscosity scale associated with the master standard tube in fixed position with respect to the latter, and a fixed straight-edge at 90° to the longitudinal axis of the aforesaid metal sheath, which straight-edge may be a part of said guide member or may be an independent member adapted to remain in fixed position with respect to said metal sheath and said guide member. The metal sheath is slotted, in front and in back, to provide a "window" substantially as long as is the internal length of a sample tube.

In connection with the combination just recited, the complete instrument includes also a (filled) master standard tube and viscosity scale associated therewith and a tube for containing the liquid to be tested, which latter members are or may be removable from the holding device per se. The master standard tube advantageously is relatively long (say, 12 to 20 inches) with respect to the tube for the liquid of unknown viscosity, which latter may be only 4 to 6 inches in length. From a practical standpoint, it is necessary that both said tubes be standardized as to internal dimensions and that they have the same internal diameter.

The viscosity scale may be etched, printed, or otherwise directly imposed, onto the wall of the master standard tube, e. g., after the manner in which temperature indicia are imposed on a conventional thermometer. Or, the master standard tube may be enclosed (in fixed position) within a metal sheath, which latter may be slotted in front and in back to provide a window substantially as long as is the internal length of the master standard tube. In such event, such metal sheath and the master standard tube are longitudinally movable as a unit in the aforesaid guide member, and the viscosity indicia may be etched, engraved, stamped, printed or otherwise imposed on such metal sheath per se. Or such metal sheath may be provided with a fixed offstanding flange upon the front face of which latter the viscosity indicia may be imposed: in such event, the flanged metal sheath and the master standard tube are longitudinally movable as a unit in the aforesaid guide member.

An advantageous variation is to provide a metal guide rod longitudinally slidable in the guide member, the major axis of which guide rod lies in the same plane with and is parallel to the major axis of the first-mentioned metal sheath (for holding the sample tube) and which is at least as long as is the master standard tube. Said guide rod is provided with two offstanding gripping members adapted to grip the master standard tube at its ends, whereby a longitudinal movement of said guide rod imparts equal and parallel longitudinal movement to said master standard tube in said guide member. In this form of the instrument the major axes of the guide rod, the master standard tube and the sample tube desirably are in substantially the same plane. Both of the gripping members may be provided with cavities (for reception of the ends of the tube) in their facing surfaces. One gripping member may be fixed to the guide rod adjacent one end of the latter, while the other gripping member may be removably secured to the guide rod, adjacent the other end of the latter, for receiving and removing the tube.

I may adapt or modify the holding device so as to include—advantageously, in the plane of the master standard and sample tubes—a third tube adapted to be substantially filled with the same liquid used in the master standard tube and to contain a thermometer immersed in said liquid and readable from the front of the instrument. Such adaptation may take the form of an added metal sheath, slotted in front and in back to provide a window for reading said thermometer, which metal sheath is adjacent and parallel to the metal sheath for holding the sample tube. In this form of the instrument I prefer to fix the added metal sheath to that for holding the sample tube and so disposed with respect to the latter as to make the plane of their longitudinal axes coincide with the longitudinal axis of the master standard tube. Since the master standard and sample tubes should be closely adjacent each other (for accurate observation of the rising bubbles), I prefer to position the sample tube between the master standard tube and the thermometer tube, and to fix the offstanding handle to the side of the added metal sheath which is remote from that for holding the sample tube.

It is to be noted that the instrument may be modified to permit of mechanical (as opposed to manual) longitudinal adjustment of the master standard tube relatively to the sample tube. Thus, the instrument may include a crank operated rack-and-pinion mechanism for moving the master standard tube upwardly and downwardly in the guide member.

The accompanying drawings illustrate practical embodiments of the invention, but the constructions shown therein are to be understood to be illustrative only, and not limitative of the invention. In the drawings, Figs. 1 and 2 are front and back elevational views, respectively, of one embodiment of the invention;

Fig. 3 is an enlarged sectional view taken on line 3—3 of the device shown in Fig. 1;

Figs. 4 and 5 illustrate the master standard tube and the sample tube, respectively, of the device shown in Figs. 1, 2 and 3;

Fig. 6 is a front elevational view of a modified form of the embodiment shown in Fig. 1;

Fig. 7 is a sectional view, taken on line 7—7 of the modified form shown in Fig. 6;

Fig. 8 is a fragmentary front elevational view of another modification of the embodiment shown in Fig. 1; and Figs. 9 and 10 are side elevational and plan views, respectively, of the embodiment shown in Fig. 8.

In Figs. 1 and 2, 10 is a tubular metal sheath for enclosing a "Pyrex" sample tube 11, said metal sheath being slotted front and back as indicated at 12 and 13. Beneath slot 12 (in the front of element 10) is a tiny aperture 14 for viewing the bottom of sample tube 11. 15 is a handle fixed to one side of element 10 at a point intermediate the ends of the latter. A guide member 16 is fixed to the side of element 10 opposite handle 15: the guide member is somewhat shorter, in the direction of the major axis of element 10, than the latter, and is so shaped as to accommodate and relatively loosely to hold parallel and adjacent to metal sheath 10, a tubular element 18 provided with an offstanding flange 19. A portion, 17, of guide member 16 is so shaped as to overlie the front of such flanged tubular element and to cooperate with the main body of guide member 16 to provide a substantially tubular sheath adjacent and parallel to metal sheath 10. The bottom edge of portion 17 is a straight-edge positioned at 90° to the major axis of element 10. This straight-edge "index line" is continued in the same plane across element 10 by the bottom edge of member 17a fixed to the upper front portion of element 10. Element 18 is slotted back and front, as indicated at 20 and 21, respectively, to provide a "window" along a major portion of the length of 18. Slot 21 is in alignment with a slot, 23, provided in guide member 16. Flange 19 is positioned at one side of element 18, substantially equidistant from slots 20 and 21.

Tubular element 18 is adapted to receive a "Pyrex" master standard tube 22, and is substantially coextensive with tube 22. Said master standard tube is of the same internal dimension as tube 11 but several times longer than the latter. In this particular embodiment, tube 22 is approximately 18 inches long, whereas sample tube 11 is approximately 4.5 inches long. Both tubes have flat bottoms, and are carefully standardized as to internal dimensions.

When prepared for use in this instrument, master standard tube 22 contains a water white, wax-free, refined mineral oil of known viscosity and specific gravity, and is sealed off (by fusion) at the top, leaving in the latter an air bubble somewhat longer than is the internal diameter of the tube. Tube 11, which is adapted to be closed by stopper 24, is provided with three scribe marks along its length, viz., one mark, 25, denoting the plane of the interior bottom of the tube; another, 26, adjacent the top marking the extent to which the stopper 24 should project into the tube, and the third, 27, denoting the height to which the tube should be filled with the sample liquid.

Viscosity indicia are provided on the front face of flange 19. In the form illustrated in Fig. 1, the indicia are in Stokes units for liquids having unit specific gravity and (in the case of one particular tube employed) there are 10 Stokes graduations to the inch: the scope of this particular standard tube is 0.5–5.0 Stokes (roughly equalling Gardner-Holdt varnish series "A" through "Q").

Element 10 is provided internally with a bronze spring clip 28 which is compressed by tube 11 so as to hold the latter against inadvertent misadjustment in element 10.

In operation, an oil of unknown viscosity is filled into the sample tube 11 to the height where the scribed line 27 appears. The tube is stoppered to the depth where a scribed line 26 appears, thus leaving a predetermined space for air, which will form an air bubble of predetermined length of approximately 4 cm. The sample tube is forced into sheath 10 against the resistance of spring clip 28 and lowered in sheath 10 until scored line 25 around the lower end of tube 11 comes into view through the small aperture 14 in the sheath. This line denotes the interior bottom of the sample tube. This precaution is taken because of the different thicknesses of tube bottoms, which may occur when the bottoms are formed. Bubbles in sample tubes should all start at this point to prevent errors in results. The bottoms of all tubes are flat. The temperature of the contents of the tubes is brought to 25° C. in a water bath. The instrument is inverted until the air bubbles in both tubes rise to the bottoms of the latter. Then the instrument is rotated ½ revolution (to the position shown in Fig. 1), whereupon both bubbles begin to rise. The tubular element 18, containing the master standard tube, is pushed up or pulled down in guide member 16 in order that the top or bottom meniscuses of both bubbles simultaneously will pass the horizontal index line provided by the bottom edges of elements 17 and 17a. The viscosity reading is taken at the point on the scale directly under the "index line" (bottom edge of element 17).

*Calibration of master standard tube*

If the used portion of the master standard tube is 15 inches long, and a bubble of ½ Stoke oil takes the same time to pass a horizontal mark 3 inches from the bottom as a bubble of a ½ Stoke oil in the sample tube passes this same mark, the maximum range of this particular master standard tube is 2½ Stokes. The range of this viscometer can then be extended by the use of another tube containing oil having a viscosity of 2½ Stokes. Such "standard tube 2" would have a range from 2½ to 12½ Stokes. Further supplemental standard tubes of increasingly wider diameters, and suitable holders therefor, would contain oils of greater viscosities than 12½ Stokes. Such larger diametered tubes would be used for the more viscous oils in order to hasten the rate of rise of the bubbles, since rate of rise of the bubble is directly proportional to the diameter of the tube. Of course, it is understood that the sample tube should be of the same diameter as the standard tube. Sample tube 1 size should be used with standard tube 1. This size tube would have a bore of approximately 8 mm. Sample tube 2 should have the same inside diameter as standard tube 2. These tubes might have a diameter of 15 mm. Sample and standard tube 3 for use with heavy-bodied oils might have a diameter of 30 to 40 mm. The wider the diameter, the faster the bubble speed.

The modified form of viscometer illustrated in Fig. 6 is functionally similar to that in Fig. 1, structurally differing from the latter mainly in the following respects: The master standard tube 22a is not encased in a tubular metal sheath adapted to move with said tube, but rather is slidably arranged in a relatively short metal sheath 30, which latter is slotted front and back and is fixed (as by brazing) at one side of metal sheath 10. Tube 22a is loosely held in sheath 30 by means of bronze spring clip 31. To that side of sheath 30 which is remote from sheath 10 is fixed (as by brazing) a somewhat smaller tubular sheath 32. Metal rod 33 is adapted to slide in sheath 32: it is slightly longer than tube 22a. Rod 33 is provided at the top end with a fixed offstanding upper retainer member 34 adapted to project over the opening in sheath 30: a portion of the bottom of member 34 is hollowed out to provide a socket 35 adapted to receive the upper end of the master standard tube 22a. Rod 33 is constricted at its bottom end to provide a shoulder 36 against which lower retainer member 37 can be removably secured by nut 38 screwed onto the threaded constricted end 39 of rod 33. A portion of the top of retainer member 37 is hollowed out to provide a socket 40 for the bottom end of tube 22a. Shoulder 36 is provided at such point along rod 33 that when retainer member 37 is pressed against it the retainer members 37 and 34 will grip tube 22a sufficiently firmly to prevent inadvertent rotation of tube 22a in sheath 30. Were it otherwise, calibrations on tube 22a would not be viewable through the slots in sheath 30.

On the side of sheath 10 which is remote from sheath 30 there is fixed (as by brazing) a tubular sheath 41, to which latter offstanding handle 15 is fixed. Sheath 41 is slotted front and back similarly to sheaths 10 and 30. As is shown in the drawings, these slots terminate at their tops in horizontal lines in a single horizontal plane. These slot tops take the place of straight edge 17 and 17a of the structure in Fig. 1. The major axes of elements 32, 30, 10 and 41 are parallel to each other and lie in the same vertical plane with the major axis of handle 15. A tube 42 substantially filled with liquid (e. g., with liquid identical with that in master standard tube 22a) and containing a sealed-in thermometer 43, is positioned within sheath 41: tube 42 is held in sheath 41 by means of bronze spring clip 44.

Master standard tube 22a has viscosity indicia directly applied (as by etching) along its length. As is illustrated in Fig. 6, both Gardner-Holdt units and Stokes units are provided, in order to enlarge the scope of use of the instrument.

The operation of the viscometer just described is essentially the same as that of the viscometer first described. Observation of the thermometer 43 indicates when the liquids have reached proper temperature (25° C.). After the bubbles have been brought to the bottoms of the tubes and the instrument has been raised as shown in Fig. 6, reciprocatory movement of rod 33 in sheath 32 directly moves tube 22a for adjusting the height of the rising bubble therein with respect to the rising bubble in tube 11 to the end that the tops or bottoms of the two bubbles are in the same horizontal plane as they reach the straight-edged tops of the slots in sheaths 30 and 10. The viscosity reading is taken from that scale mark on tube 22a which, at the finish of the test, directly underlies the straight edged top of the slot in sheath 30.

It will be obvious that the inclusion of a thermometer tube and sheath therefor in this instrument is optional, and same may well be omitted from the instrument where means for determining the temperature of a water bath, or other means for bringing the liquids contained in the instrument to a temperature of 25° C., are otherwise available. With the thermometer tube and sheath therefor omitted, the handle 15 is of course fixed to that side of sheath 10 which is remote from sheath 30.

According to the embodiment illustrated in Figs. 8, 9 and 10, the instrument shown in Fig. 1 is modified by fixing a rack 50 to the rear face of flange 19 and by providing rotatable pinion 51. The drive shaft, 52, of pinion 51 is journaled in a cylindrical bearing member 53. Member 53 is fixed (as by brazing) to the rear of guide member 16. A crank 54 is fixed to shaft 52 for rotating pinion 51.

In using this instrument, adjustment of the height of master standard tube 22 is effected by operation of crank 54 in one direction or the other.

It is to be understood that the invention is in no wise restricted to the particular materials of construction mentioned in the above specific description, and that the same is not restricted to the precise structures described. Thus, the two tubes, described above as being formed from "Pyrex" glass, may be tubes formed from other glasses or from any other substantially transparent and otherwise suitable material than glass. "Bronze spring clips" for retaining the tubes in their sheaths may of course be substituted by any known equivalents of the former. The rack and pinion mechanism shown in Figs. 8, 9 and 10 may be used in conjunction with the form of instrument shown in Fig. 6, by imposing the rack on slidable rod 33 and supporting the pinion and its journaled shaft on the tube mounting, 30, 10. In this latter connection, it is to be noted that while the crank for the rack and pinion mechanism has been shown in Figs. 8, 9 and 10 as being on the right hand side of the instrument, the crank position may be reversed—for left-hand operation.

I claim:

1. A viscometer of the air bubble type, comprising a master standard tube containing a liquid of known viscosity, a viscosity scale associated with said master standard tube and having a fixed relation to the latter during use, a like-diametered sample tube adapted to contain a liquid of unknown viscosity, means for mounting the master standard tube adjacent to and in substantial parallelism with the sample tube, said mounting means permitting relative substantially vertical movement of the master standard tube with respect to the sample tube during rise of bubbles in said tubes, and rectilinear index establishing means associated with the two tubes and positioned at right angles to the major axes of the latter to facilitate the observation of the arrival of the bubbles in said tubes at the same level and simultaneously the reading of the scale at said level.

2. A viscometer of the air bubble type, comprising a master standard tube containing a liquid of known viscosity, a viscosity scale associated with said master standard tube and having a fixed relation to the latter during use, a like-diametered sample tube adapted to contain a liquid of unknown viscosity, means for mounting the two tubes adjacent and substantially parallel to each other, and rectilinear index-establishing means associated with the two tubes at right angles to the major axes of the latter and in a fixed position with respect to said sample tube, said index-establishing means permitting observation of the arrival of the bubbles in said tubes at a common predetermined level and the reading of the scale at said level, said mounting means permitting relative longitudinal movement of said master standard tube with respect to said sample tube during the conduct of a viscosity determination involving use of said viscometer.

3. The viscometer defined in claim 1, in which the mounting means includes an apertured tubular sheath for receiving the sample tube.

4. The viscometer defined in claim 2, in which the mounting means includes an apertured tubular sheath for receiving the sample tube and a guide member in which the master standard tube is slidably supported.

5. The viscometer defined in claim 2, in which the mounting means includes two apertured tubular sheaths in fixed parallel arrangement, in one of which tubular sheaths the master standard tube is slidable in fixed association with the viscosity scale.

6. A viscometer of the air bubble type, comprising a master standard tube containing a liquid of known viscosity, an apertured tubular sheath substantially coextensive with said master standard tube and carrying along a substantial part of its length to one side of said aperture an offstanding substantially plane member provided therealong with a viscosity scale, said master standard tube being removably secured within said apertured tubular sheath, a sample tube having the same diameter as that of said master standard tube adapted to contain a liquid of unknown viscosity, a tube mounting means including an apertured tubular sheath in which the sample tube is removably secured and a guide member in which the sheathed master standard tube is manually slidably supported for relative movement of the latter longitudinally of and in substantial parallelism with said sample tube when the viscometer is in use, and rectilinear index-establishing means fixedly associated with said tube mounting means at right angles to the major axes of the two tubes and in a fixed position with respect to said sample tube when the latter is removably secured in its apertured tubular sheath, said index-establishing means extending over and adjacent to the two tubes and said scale-carrying plane member to facilitate the observation of the conjoint arrival of the bubbles in both tubes at the level of said index-establishing means and the reading of the scale at said level.

7. A viscometer of the air bubble type, comprising two apertured tubular sheaths in fixed parallel arrangement, a master standard tube containing a liquid of known viscosity and carrying along its length a viscosity scale, a sample tube adapted to contain a liquid of unknown viscosity, said master standard tube being relatively long with respect to the sample tube and being slidably supported in one of said tubular sheaths and said sample tube being removably carried in the other of said tubular sheaths, and rectilinear index-establishing means at right angles to the major axes of both tubes and adjacent one end of that tubular sheath which carries said sample tube.

8. The combination defined in claim 7, characterized in that the master standard tube is held against rotation in its supporting sheath by means of a longitudinally movable rod substantially coextensive with and parallel to said master standard tube and slidably supported in a third tubular sheath in fixed parallel arrangement with said two apertured tubular sheaths, said rod being provided at its ends with offstanding retainer members which latter are adapted to grip the ends of said master standard tube.

9. The combination defined in claim 1, in which the master standard tube is adapted to measure viscosities within the range 0.5-5.0 Stoke units.

10. The combination defined in claim 1, in which the master standard tube is adapted to measure viscosities within the range 2.5-12.5 Stoke units.

11. The combination defined in claim 1, in which the length of the master standard tube is about 4 times that of the standard tube, and the liquid contained in the master standard tube is a water-white, substantially wax-free refined mineral oil.

12. The combination defined in claim 7, including mechanical means for imparting longitudinal movement to said master standard tube.

13. The combination defined in claim 2, including a rack and pinion mechanism carried by the mounting means and operably associated with the master standard tube and adapted to impart longitudinal movement to the latter.

14. A method of determining directly the viscosity of a liquid which comprises, placing the liquid and a liquid of known viscosity in like diametered tubes leaving in each tube an air bubble somewhat longer than is the internal diameter of the tube, the tube containing the liquid of known viscosity having been calibrated to indicate thereon a range of viscosities at some definite predetermined temperature, closing the tubes, bringing the two liquids to the aforesaid definite predetermined temperature, holding the two tubes adjacent and parallel to each other while bringing the bubbles therein to the top ends of said tubes, rotating the two tubes so that the bubbles therein are at their bottom ends while holding the two tubes adjacent and parallel to each other, vertically moving one of said tubes relatively to the other, while the bubbles are rising in said tubes, in such manner that when the bubble in the tube containing the liquid the viscosity of which is to be determined has risen to a predetermined level in its tube it and the bubble in the tube containing the liquid of known viscosity shall be in the same horizontal plane, and directly reading the viscosity from the calibrated tube at said level.

PAUL N. GARDNER.